(12) United States Patent
Moon (10) Patent No.: US 11,703,596 B2
(45) Date of Patent: Jul. 18, 2023

(54) METHOD AND SYSTEM FOR AUTOMATICALLY PROCESSING POINT CLOUD BASED ON REINFORCEMENT LEARNING

(71) Applicant: HL KLEMOVE CORP., Incheon (KR)

(72) Inventor: Seongjoo Moon, Yongin-si (KR)

(73) Assignee: HL KLEMOVE CORP., Incheon (KR)

( * ) Notice: Subject to any disclaimer, the term of this patent is extended or adjusted under 35 U.S.C. 154(b) by 164 days.

(21) Appl. No.: 17/217,338

(22) Filed: Mar. 30, 2021

(65) Prior Publication Data
US 2021/0304496 A1 Sep. 30, 2021

(30) Foreign Application Priority Data
Mar. 31, 2020 (KR) .................. 10-2020-0038695

(51) Int. Cl.
| | |
|---|---|
| G01S 17/86 | (2020.01) |
| G01S 17/89 | (2020.01) |
| G06N 20/00 | (2019.01) |
| G06T 17/20 | (2006.01) |
| G06T 7/50 | (2017.01) |
| G06T 7/80 | (2017.01) |
| G06T 7/70 | (2017.01) |
| G01S 7/48 | (2006.01) |
| G01S 17/42 | (2006.01) |

(Continued)

(52) U.S. Cl.
CPC ............ *G01S 17/86* (2020.01); *G01S 7/4802* (2013.01); *G01S 17/42* (2013.01); *G01S 17/89* (2013.01); *G06F 18/214* (2023.01); *G06F 18/22* (2023.01); *G06N 20/00* (2019.01);

*G06T 7/50* (2017.01); *G06T 7/70* (2017.01); *G06T 7/80* (2017.01); *G06T 17/20* (2013.01); *G06V 10/82* (2022.01); *G06V 20/58* (2022.01); *G06T 2207/10028* (2013.01); *G06T 2207/20081* (2013.01)

(58) Field of Classification Search
None
See application file for complete search history.

(56) References Cited

U.S. PATENT DOCUMENTS

2019/0220673 A1* 7/2019 Ikeda .................... G06T 7/75
2020/0279120 A1* 9/2020 Bao ..................... G06V 10/809
(Continued)

OTHER PUBLICATIONS

Li (Fusion of LiDAR 3D Points Cloud With 2D Digital Camera Image, 2015) (Year: 2015).*
(Continued)

*Primary Examiner* — Kyle Zhai
(74) *Attorney, Agent, or Firm* — Hauptman Ham, LLP (57) ABSTRACT

A method and system for automatically processing point cloud based on reinforcement learning are provided. The method for automatically processing point cloud based on reinforcement learning according to an embodiment of the present disclosure includes scanning to collect a point cloud (PCL) and an image through a lidar and a camera; calibrating, by a controller, to match locations of the image and the point cloud through reinforcement learning that maximizes a reward including geometric and luminous intensity consistency of the image and the point cloud; and meshing, by the controller, the point cloud into a 3D image through reinforcement learning that minimizes a reward including a difference between a shape of the image and a shape of the point cloud.

22 Claims, 4 Drawing Sheets

(51) Int. Cl.
   *G06F 18/22*    (2023.01)
   *G06F 18/214*   (2023.01)
   *G06V 10/82*    (2022.01)
   *G06V 20/58*    (2022.01)

(56) References Cited

U.S. PATENT DOCUMENTS

2020/0400821 A1* 12/2020 Baker .................... G01S 17/58
2021/0035314 A1*  2/2021 Shu ....................... G06V 10/34

OTHER PUBLICATIONS

Fang et al. (Camera and LiDAR Fusion for On-road Vehicle Tracking with Reinforcement Learning, IEEE, 2019) (Year: 2019).*

* cited by examiner

METHOD AND SYSTEM FOR AUTOMATICALLY PROCESSING POINT CLOUD BASED ON REINFORCEMENT LEARNING

CROSS-REFERENCE TO RELATED APPLICATION

This application claims priority to and the benefit of Korean Patent Application No. 10-2020-0038695, filed on Mar. 31, 2020, the disclosure of which is incorporated herein by reference in its entirety.

TECHNICAL FIELD

The present disclosure relates to a method and system for automatically processing point cloud based on reinforcement learning.

BACKGROUND

Autonomous vehicles use 3D lidar and 2D camera together for object recognition. In addition, object recognition using the 3D lidar and the 2D camera is also used in construction site supervision. In this case, it can be used to supervise the construction situation by comparing the actual measurement information obtained by the 3D lidar and the 2D camera with the design information.

At this time, in order to collect meaningful data using these sensors, they must be accurately calibrated because the performance of these sensors is very sensitive to a calibration parameter.

However, most of the existing calibration techniques rely on a specific calibration target such as a checkerboard, and a large amount of manual work is required. This has a serious impact on the applicability of large-scale systems. Therefore, automation and online calibration techniques are required to significantly expand flexibility and adaptability.

Meanwhile, semantic parsing of a large-scale 3D point cloud (PCL) is an important subject of research in the field of computer vision and remote sensing. Most of the existing approaches independently utilize features created manually for each modality and combine them in a heuristic manner.

However, unlike an image in which a spatial relationship between pixels can be obtained while moving a window, the points in the point cloud are not organized and the point density is not uniform. Therefore, it is difficult to obtain a high-level semantic structure. That is, the existing method is difficult to apply to recognize the 3D point cloud and requires a lot of labor.

The above information disclosed in this Background section is only for enhancement of understanding of the background of the disclosure and it may therefore contain information that does not form the prior art that is already known to a person of ordinary skill in the art.

SUMMARY

One embodiment of the present disclosure is directed to providing a method and system for automatically processing point cloud based on reinforcement learning capable of automatically performing a lidar-camera calibration and meshing of a point cloud for 3D work.

The technical problems to be solved in the present disclosure are not limited to the technical problems mentioned above, and other technical problems not mentioned will be clearly understood by those of ordinary skill in the art from the following description.

One aspect of the present disclosure is directed to providing a method for automatically processing point cloud based on reinforcement learning, including scanning to collect a point cloud (PCL) and an image through a lidar and a camera; calibrating, by a controller, to match locations of the image and the point cloud through reinforcement learning that maximizes a reward including geometric and luminous intensity consistency of the image and the point cloud; and meshing, by the controller, the point cloud into a 3D image through reinforcement learning that minimizes a reward including a difference between a shape of the image and a shape of the point cloud.

In an embodiment, the calibrating may be performed by an action including a translation velocity vector and a rotation velocity vector.

In an embodiment, in the calibrating, the reward may include a luminous intensity loss which is a pixel-wise error between a mis-calibrated depth map and a target depth map, and a point cloud distance loss which is a distance between a transformed point cloud and a target point cloud.

In an embodiment, the point cloud distance loss may be a sum of squares of distances of closest points between two point clouds.

In an embodiment, in the calibrating, the reinforcement learning may be performed by a discrete value iteration (DVI) reinforcement learning algorithm.

In an embodiment, the calibrating may include transforming the point cloud into a depth map by projecting the point cloud onto an image plane.

In an embodiment, the calibrating may include a step of 3D spatial transformation which transforms the depth map by a transformation matrix.

In an embodiment, the meshing may be performed by an action including a motion vector of a catch particle.

In an embodiment, the meshing may include determining the motion vector to capture a point cloud having highest correlation among adjacent point clouds.

In an embodiment, in the meshing, the reward may include a difference between a location of an octree data extracted from the image and a location of a point cloud to be connected next which is captured by the catch particle through a motion according to the action.

In an embodiment, the meshing may include dividing the point cloud into small unit screens and parsing while moving a window.

In an embodiment, in the meshing, the reinforcement learning may be performed by a discrete value iteration (DVI) reinforcement learning algorithm.

Another aspect of the present disclosure provides a reinforcement learning based lidar-camera calibration method that matches locations of a point cloud (PCL) and an image collected by a lidar and a camera, based on reinforcement learning, in a system for automatically processing point cloud based on reinforcement learning, in which the reinforcement learning is performed by a reward for maximizing geometric and luminous intensity consistency of the image and the point cloud, and an action including a translation velocity vector and a rotation velocity vector.

In an embodiment, the reward may include a luminous intensity loss which is a pixel-wise error between a mis-calibrated depth map and a target depth map, and a point cloud distance loss which is a distance between a transformed point cloud and a target point cloud.

In an embodiment, the point cloud distance loss may be a sum of squares of distances of closest points between two point clouds.

In an embodiment, the reinforcement learning may be performed by a discrete value iteration (DVI) reinforcement learning algorithm.

In an embodiment, the reinforcement learning based lidar-camera calibration method may further include transforming the point cloud into a depth map by projecting the point cloud onto an image plane.

In an embodiment, the reinforcement learning based lidar-camera calibration method may further include a step of 3D spatial transformation which transforms the depth map by a transformation matrix.

Yet another aspect of the present disclosure provides a reinforcement learning based point cloud mesh method that meshes a point cloud into a 3D image, using a point cloud and an image collected by a lidar and a camera, based on reinforcement learning, in a system for automatically processing point cloud based on reinforcement learning, in which the reinforcement learning is performed by a reward for minimizing a difference between a shape of the image and a shape of the point cloud, and an action including a motion vector of a catch particle.

In an embodiment, the reinforcement learning may determine the motion vector to capture a point cloud having highest correlation among adjacent point clouds.

In an embodiment, the reward may include a difference between a location of an octree data extracted from the image and a location of a point cloud to be connected next which is captured by the catch particle through a motion according to the action.

In an embodiment, the reinforcement learning based point cloud mesh method may further include dividing the point cloud into small unit screens and parsing while moving a window.

In an embodiment, the reinforcement learning may be performed by a discrete value iteration (DVI) reinforcement learning algorithm.

Still another aspect of the present disclosure provides a system for automatically processing point cloud based on reinforcement learning, including a lidar for collecting a point cloud; a camera for collecting an image; and a controller communicatively connected to the lidar and the camera and configured to: calibrate to match locations of the image and the point cloud through reinforcement learning that maximizes a reward including geometric and luminous intensity consistency of the image and the point cloud, and mesh the point cloud into a 3D image through reinforcement learning that minimizes a reward including a difference between a shape of the image and a shape of the point cloud.

Still another aspect of the present disclosure provides a reinforcement learning based lidar-camera calibration system, including a lidar for collecting a point cloud; a camera for collecting an image; and a controller communicatively connected to the lidar and the camera and configured to match locations of the point cloud and the image based on reinforcement learning, in which the reinforcement learning is performed by a reward for maximizing geometric and luminous intensity consistency of the image and the point cloud, and an action including a translation velocity vector and a rotation velocity vector.

Still another aspect of the present disclosure provides a reinforcement learning based point cloud mesh processing system, including a lidar for collecting a point cloud; a camera for collecting an image; and a controller communicatively connected to the lidar and the camera and configured to mesh the point cloud into a 3D image, using the point cloud and the image, based on reinforcement learning, in which the reinforcement learning is performed by a reward for minimizing a difference between a shape of the image and a shape of the point cloud, and an action including a motion vector of a catch particle.

The method and system for automatically processing point cloud based on reinforcement learning may alleviate the need for a calibration target and significantly reduce the effort of lidar-camera calibration by performing reinforcement learning to maximize a reward including geometric and luminous intensity consistency of the input image and the point cloud.

In addition, the present disclosure may improve the productivity of mesh creation since most parameters are learned and the cost of intensive parameter tuning is significantly reduced by performing reinforcement learning to minimize a reward including a difference between a shape of a camera image and a shape of point cloud data.

BRIEF DESCRIPTION OF THE DRAWINGS

The above and other aspects, features, and advantages of the present disclosure will become more apparent to those of ordinary skill in the art by describing embodiments thereof in detail with reference to the accompanying drawings, in which.

DETAILED DESCRIPTION OF THE EMBODIMENTS

Hereinafter, exemplary embodiments of the present disclosure will be described in detail so that those of ordinary skill in the art can readily implement the present disclosure with reference to the accompanying drawings. The present disclosure may be embodied in many different forms and are not limited to the embodiments set forth herein. In the drawings, parts unrelated to the description are omitted for clarity. Throughout the specification, like reference numerals denote like elements.

Embodiments of the present disclosure are provided to describe the present disclosure more fully to those skilled in the art, the embodiments described below can be modified into various other forms, and the scope of the present disclosure is not limited to the following embodiments. Rather, these embodiments make the disclosure more meaningful and complete and are provided for fully conveying the concept of the disclosure to those of ordinary skill in the art.

Figure 1:
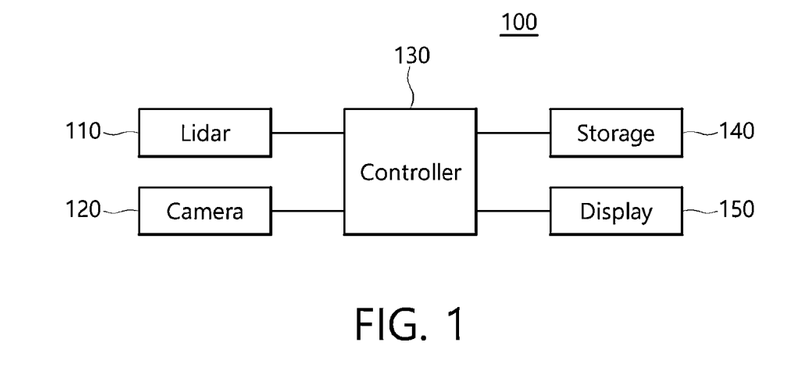
FIG. 1 is a block diagram of a system for automatically processing point cloud based on reinforcement learning according to an exemplary embodiment of the present disclosure.

FIG. 1 is a block diagram of a system for automatically processing point cloud based on reinforcement learning according to an exemplary embodiment of the present disclosure.

Referring to FIG. 1, a system for automatically processing point cloud based on reinforcement learning 100 according to an embodiment of the present disclosure includes a lidar 110, a camera 120, a controller 130, a storage 140, and a display 150.

The system for automatically processing point cloud based on reinforcement learning 100 is a system applied to an autonomous vehicle, and the system is automated by replacing a scan to mesh process, based on reinforcement learning instead of a rule-based method that relies on manual labor. In addition, the system for automatically processing point cloud based on reinforcement learning 100 may be applied to a 3D scanner, a Virtual Reality (VR)/Augmented Reality (AR) system, and a robot mapping system.

Here, the reinforcement learning may be understood as a process of selecting an action that maximizes or minimizes a reward among selectable actions for adjacent points by recognizing the state of the currently working point when performing lidar-camera calibration or point cloud-based 3D image mesh.

The lidar 110 may collect point clouds. Here, the lidar 110 may be a 3D lidar. For example, the lidar 110 may be mounted to at least one of a front, rear, or side of a vehicle to recognize an object in a driving direction.

The camera 120 may collect images. Here, the camera 120 may be a 2D camera. For example, the camera 120 may be mounted to at least one of a front, rear, or side of a vehicle to recognize an object in a driving direction.

The controller 130 may be communicatively connected to the lidar 110, the camera 120, the storage 140, and the display 150. For example, the controller 130 may be an ECU of a vehicle. Optionally, the controller 130 may be a controller separately equipped for the scan to mesh in a vehicle.

In addition, the controller 130 may be configured to match the locations of a point cloud (PCL) collected by the lidar 110 and an image collected by the camera 120 based on reinforcement learning. Here, the reinforcement learning may be performed by a reward for maximizing geometric and luminous intensity consistency of image and point cloud (PCL), and an action including a translation velocity vector and a rotation velocity vector.

That is, the controller 130 may perform a calibration algorithm 300 as described later. Here, a detailed description is omitted.

In addition, the controller 130 may be configured to mesh a point cloud (PCL) into a 3D image using a point cloud (PCL) collected by the lidar 110 and an image collected by the camera 120. Here, the reinforcement learning may be performed by a reward for minimizing the difference between a shape of an image and a shape of a point cloud (PCL), and an action including a motion vector of a catch particle.

In this case, the controller 130 may perform a mesh algorithm 400 as described later. Here, a detailed description is omitted.

The storage 140 may store a lidar-camera calibration or a point cloud-based 3D image mesh process or work data according to a result.

The display 150 may display the lidar-camera calibration or the point cloud-based 3D image mesh process or the result.

Hereinafter, a method for automatically processing point cloud based on reinforcement learning of the present disclosure will be described with reference to FIGS. 2 to 6.

Figure 2:
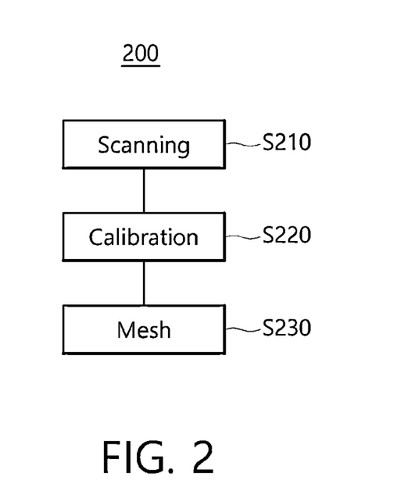
FIG. 2 is a flowchart of a method for automatically processing point cloud based on reinforcement learning according to an exemplary embodiment of the present disclosure.

FIG. 2 is a flowchart of a method for automatically processing point cloud based on reinforcement learning according to an exemplary embodiment of the present disclosure.

The method for automatically processing point cloud based on reinforcement learning 200 includes a step of scanning to collect a point cloud (PCL) and an image (S210), a step of calibrating to match the locations of the image and the point cloud (PCL) (S220), and a step of meshing the point cloud (PCL) into a 3D image (S230).

Here, the step of calibrating (S220) and the step of meshing the point cloud (PCL) into a 3D image (S230).

In more detail, as shown in FIG. 2, first, the system for automatically processing point cloud based on reinforcement learning 100 collects a point cloud (PCL) and an image through the lidar 110 and the camera 120 at step S210. At this time, the point cloud (PCL) may be 3D lidar data, and the image may be 2D camera data.

Next, the system for automatically processing point cloud based on reinforcement learning 100 calibrates to match the locations of the image and the point cloud (PCL) through reinforcement learning that maximizes a reward including geometric and luminous intensity consistency of image and point cloud (PCL) at step S220.

Figure 3:
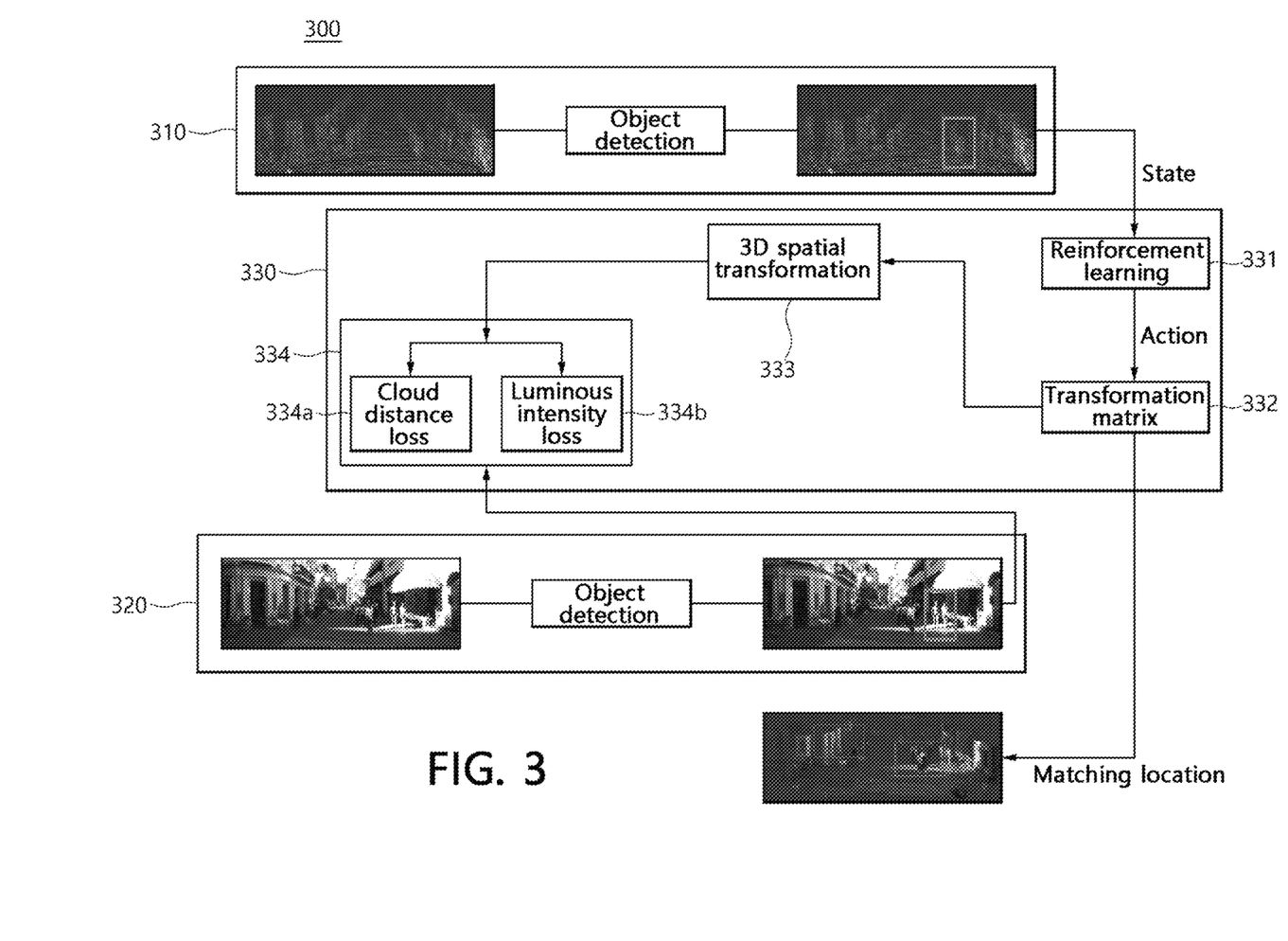
FIG. 3 is a diagram showing a calibration algorithm in FIG. 2.

Hereinafter, a calibration algorithm 300 will be described in more detail with reference to FIG. 3. FIG. 3 is a diagram showing a calibration algorithm in FIG. 2.

The calibration algorithm 300 performs lidar-camera calibration in real time without the assumption that a specific feature or landmark exists in a scene and without any estimation for external parameters. That is, it estimates the transformation between the 3D lidar and the 2D camera.

In addition, the calibration algorithm 300 repeatedly solves basic geometric problems without the need for retraining or domain adaptation, and learns to accurately predict external calibration parameters for a wide range of mis-calibrations. That is, the calibration algorithm 300 trains the network to predict a calibration parameter that maximizes geometric and luminous intensity consistency of the input image and point cloud.

The calibration algorithm 300 may include PCL object detection 310, camera object detection 320, and reinforcement learning mechanism 330.

The PCL object detection 310 may detect an object from a point cloud (PCL). Here, the point cloud may first be transformed into a sparse depth map as a pre-processing. This can be done by projecting a lidar point cloud onto an image plane. At this time, because the initial mis-calibration is inaccurate, the mis-calibrated point results in a sparse depth map that does not extremely match the image when projected onto the image plane.

The camera object detection 320 may detect an object from an RGB image obtained from the camera 120.

The reinforcement learning mechanism 330 may include reinforcement learning 331, a transformation matrix 332, a 3D spatial transformation 333, and a reward 334.

The reinforcement learning 331 may be performed by a reward 334 for maximizing geometric and luminous intensity consistency of image and point cloud (PCL), and an action including a translation velocity vector and a rotation velocity vector. In this case, for the reinforcement learning 331, a result of the PCL object detection 310 may be input as a state. For example, the reinforcement learning 331 may be performed by a discrete value iteration (DVI) reinforcement learning algorithm.

The transformation matrix 332 may be determined according to an action of the reinforcement learning 331.

Here, the transformation matrix 332 may include transformation components corresponding to the translation velocity vector and the rotation velocity vector.

The 3D spatial transformation 333 may transform an input depth map by the predicted transformation matrix 332. In this case, the 3D spatial transformation 333 may transform a point cloud obtained by external calibration predicted by the network. Then, the 3D spatial transformation 333 may project the transformed point cloud back onto the image plane using the camera internal parameters.

The reward 334 may include a loss function. Here, in the case of external parameter calibration, it is much more necessary to use a dense method for registration. At this time, two types of loss conditions may be used during training.

The reward 334 may include cloud distance loss 334a and luminous intensity loss 334b. Here, the luminous intensity loss 334b transforms the depth map by the predicted transformation matrix 332 and then examines a dense pixel-wise error between the predicted depth map and the correct depth map. In this case, since each pixel is encoded with a depth intensity, the pixel-wise error is examined.

The luminous intensity loss 334b ($L_{photo}$) is defined as Equation 1 below:

$$L_{photo} = \frac{1}{2} \sum_{1}^{N} (D_{gt} - KT\pi^{-1}[D_{miscalib}])^2 \quad \text{[Equation 1]}$$

Here, $D_{gt}$ is a target depth map, $D_{miscalib}$ is an initial mis-calibrated depth map, T is a transformation matrix, K is a camera calibration matrix, and $\pi$ is a perspective projection operator.

Meanwhile, the 3D spatial transformation 333 may transform the point cloud after backprojection. At this time, it attempts to minimize the 3D-3D point distance between the transformed point cloud and the target point cloud using the transformed point cloud and the target point cloud.

Cloud distance loss 334a may be a distance between the transformed point cloud and the target point cloud. For example, a chamfer distance may be used as a distance between two point clouds in actual coordinates. The chamfer distance ($d_{CD}$) is a sum of squares of distances of closest points between two point clouds, and is defined as in Equation 2 below:

$$d_{CD}(S1, S2) = \sum_{x \in S_1} \min_{y \in S_2} \|x-y\|_2^2 + \sum_{y \in S_2} \min_{x \in S_1} \|x-y\|_2^2 \quad \text{[Equation 2]}$$

Here, x and y are actual coordinates.

In this case, the reward 334 may be a final loss function consisting of a sum of weighted values of the luminous intensity loss and the point cloud distance loss. The final loss function (L final) is as shown in Equation 3 below:

$$L_{final} = \alpha_{ph}(L_{photo}) + \beta_{dist}(d(S_1, S_2)) \quad \text{[Equation 3]}$$

Here, $\alpha_{ph}$ is a weighted value of the luminous intensity loss, and $\beta_{dist}$ is a weighted value of the point cloud distance loss.

Referring to FIG. 2 again, the system for automatically processing point cloud based on reinforcement learning 100 meshes the point cloud (PCL) into a 3D image through reinforcement learning that minimizes a reward including the difference between the shape of the image and the shape of the point cloud (PCL) at step S230.

Figure 4:
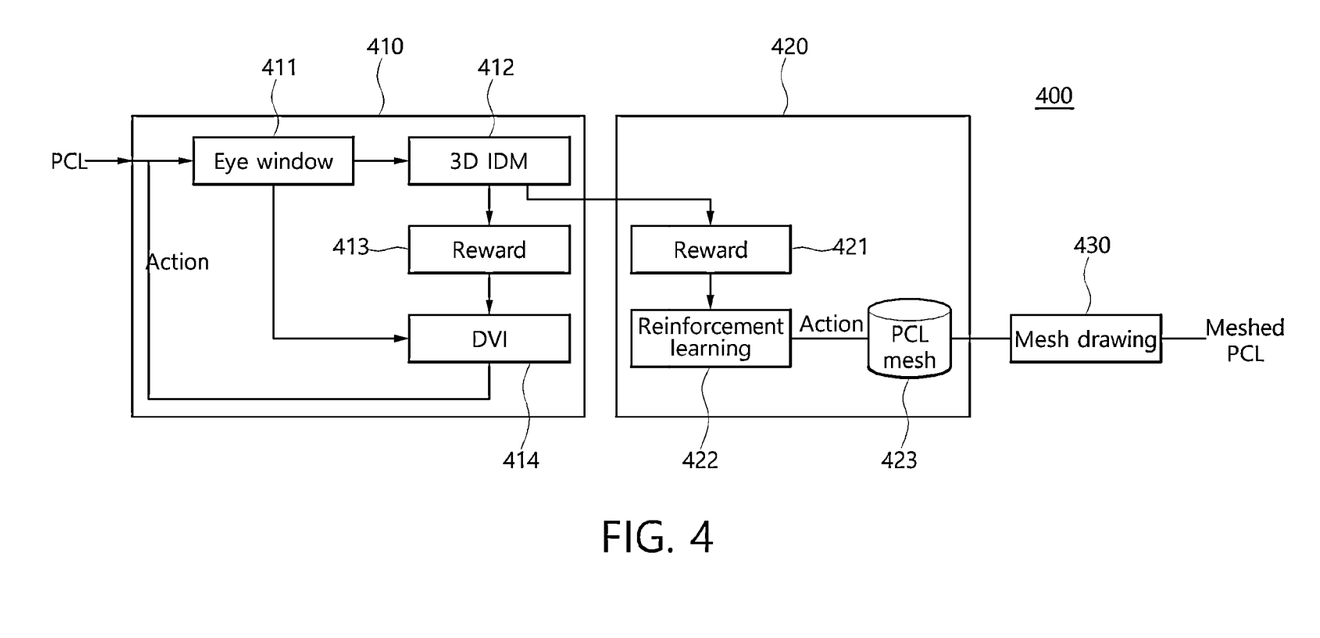
FIG. 4 is a diagram showing a mesh algorithm in FIG. 2.
Figure 5:
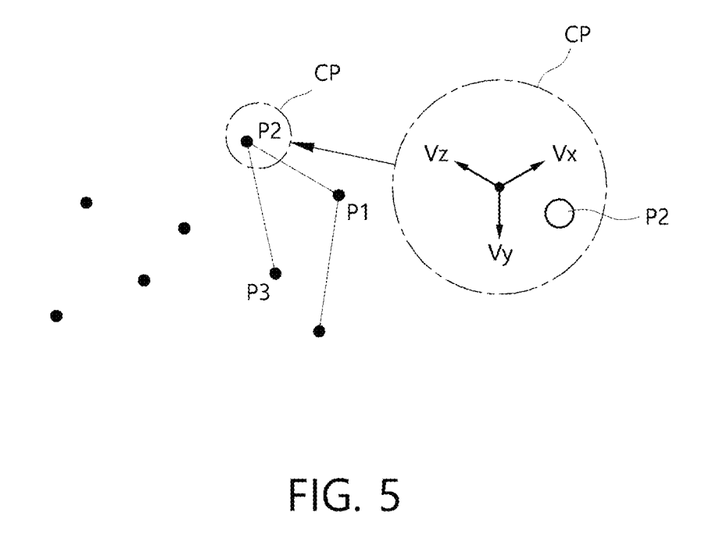
FIG. 5 is a diagram for explaining a process of connecting next points by the mesh algorithm of FIG. 4.
Figure 6:
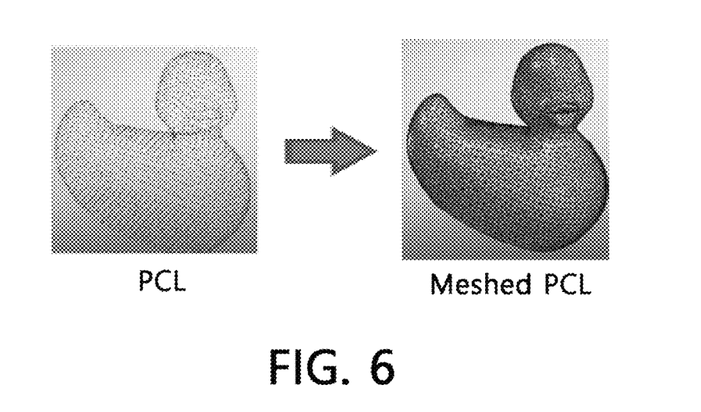
FIG. 6 is a diagram showing input data and output data of the mesh algorithm of FIG. 4.

Hereinafter, a mesh algorithm 400 will be described in more detail with reference to FIGS. 4 to 6. FIG. 4 is a diagram showing a mesh algorithm in FIG. 2, FIG. 5 is a diagram for explaining a process of connecting next points by the mesh algorithm of FIG. 4, and FIG. 6 is a diagram showing input data and output data of the mesh algorithm of FIG. 4.

The mesh algorithm 400 is for automatically linking point clouds, and generates a mesh image by finding and using adjacent point clouds having an optimal correlation between point clouds. Here, the mesh algorithm 400 trains the network to predict a mesh parameter that minimizes the difference between the shape of the input image and the shape of the point cloud.

In this case, the mesh algorithm 400 is based on deep reinforcement learning to automatically analyze a large 3D point cloud. That is, the mesh algorithm 400 includes a deep reinforcement learning framework for semantically parsing a large 3D point cloud by recognizing all class objects.

The mesh algorithm 400 may include a movement mechanism 410 and a reinforcement learning mechanism 420.

The movement mechanism 410 may divide a point cloud screen including large-scale information into small unit screens, and parse while moving the viewpoint from the unit screen to reinforcement learning.

The movement mechanism 410 may include an eye window 411, a 3D IDM 412, a reward 413, and a DVI 414.

The eye window 411 may efficiently localize and segment the points of the object class under the control of the 3D IDM 412 and the DVI 414.

The 3D IDM (Image Detection Machine-learning) 412 may significantly improve the accuracy of parsing a large-scale point cloud by additionally extracting strong and discriminative features of a point from the eye window 411.

In addition, the 3D IDM 412 is trained to determine other class objects. The feature representation of the points of each class is obtained by 3D IDM 412. And then these features may be encoded and applied to the reinforcement learning mechanism 420.

In addition, the 3D IDM 412 may learn features for the shape, spatial relationship, color, and context of points in the point cloud through supervised learning at multiple scales, and then encode them into discriminative feature representations called 3D IDM features. In this case, in order to recognize a specific object in the point cloud, the eye window 411 may search all data to localize a point belonging to a specific class.

That is, in order to parse the point cloud efficiently and effectively, the movement mechanism 410 may first set the eye window 411 of a specific size and apply 3D IDM while moving in the scene to recognize the data inside the eye window.

The reward 413 is an output of the 3D IDM 412 and may indicate a probability that a class object is to be included in the eye window.

Discrete Value Iteration (DVI) 414 may detect and localize objects. The DVI 414 may automatically recognize the scene based on the feedback from the 3D IDM 412 and localize the object by adjusting its parameters.

In this case, the DVI 414 may control the size and location of the eye window 411. During the search, the DVI 414 obtains a probability that a class object is to be included in the eye window 411. In this case, the probability may be calculated through the reward 413 vectors that are output from the 3D IDM 412.

The eye window 411 under the control of the DVI 414 may efficiently locate the class object according to the reward 413. That is, it is possible to optimize the search path.

Next, the movement mechanism 410 determines which area is worth viewing, then changes the size of the eye window and moves to the area. In this case, 3D IDM may be applied again to calculate the reward vector of the point in the new eye window 411. The process repeats until the eye window 411 correctly envelopes the point of the class object.

When the class object is localized and enveloped, 3D IDM features, and coordinates and colors of each point in the eye window may be combined into a vector that is input to the reinforcement learning mechanism 420. The eye window 411 may continue to move until all points of the class object have been parsed.

The reinforcement learning mechanism 420 may include a reward 421, a reinforcement learning 422 and a PCL mesh 423.

In order to minimize the difference between the shape of the input image and the shape of the point cloud, the reward 421 may use the difference in each location. Here, the location of the input image may be a location of extracted octree data. In addition, the location of the point cloud may be a location of a point cloud to be connected next which is captured by a catch particle through a motion according to an action.

Thus, the reward 421 may include the difference between the location of the octree data and the location of the point cloud to be connected next which is captured by the catch particle. At this time, the location of the extracted octree data may be a reference.

Here, the reinforcement learning 422 may be performed by a reward 421 for minimizing the difference between a shape of an image and a shape of a point cloud (PCL), and an action including a motion vector of a catch particle.

In this case, the reinforcement learning 422 may perform a reinforcement learning algorithm so that the catch particle finds an optimal motion policy for connection of the next point cloud. Here, the reinforcement learning 422 may determine a motion vector to capture a point cloud having the highest correlation among adjacent point clouds.

Referring to FIG. 5, the reinforcement learning 422 may determine a motion vector for the x-direction, y-direction, and z-direction of the catch particle CP. Here, the motion vector may be a velocity vector (Vx, Vy, Vz) for each direction. In this case, the reinforcement learning 422 may determine a motion vector of the catch particle CP so that the second point cloud P2 to be connected from the first point cloud P1 can be captured by the catch particle CP.

Here, the catch particle CP may be defined as a particle having mobility to capture a point cloud to be connected next. Such a catch particle CP may perform optimal motion according to the action of the reinforcement learning 422. As an example, in FIG. 5, the point clouds P1 to P3 may be linked and meshed by moving the catch particle CP to the adjacent point cloud P3.

In this case, 3D IDM 412 features, and coordinates and colors of each point in the eye window 411 may be input to the reinforcement learning 422. For example, the reinforcement learning 422 may be performed by a discrete value iteration (DVI) reinforcement learning algorithm.

The PCL mesh 423 stores a single link result for each point according to an action by the reinforcement learning 421.

Mesh drawing 430 draws a mesh according to the PCL mesh 423. That is, the mesh drawing 430 may generate a meshed point cloud by drawing a mesh of point cloud as a result of the reinforcement learning mechanism 420.

The meshed point cloud as shown on the right side of FIG. 6 may be automatically generated from the point cloud as shown on the left side of FIG. 6.

Such methods may be implemented by the system for automatically processing point cloud based on reinforcement learning as shown in FIG. 1, and in particular, may be implemented as a software program that performs such steps, wherein such a program may be stored on a computer-readable recording medium or transmitted by a computer data signal combined with a carrier wave in a transmission medium or a communication network.

In this case, the computer-readable recording medium may include any kind of recording device in which data readable by a computer system is stored.

Although exemplary embodiments of the present disclosure have been described above, the spirit of the present disclosure is not limited to the embodiments set forth herein. Those of ordinary skill in the art who understand the spirit of the present disclosure may easily propose other embodiments through supplement, change, removal, addition, etc. of elements within the same spirit, but the embodiments will be also within the scope of the present disclosure.

What is claimed is:

1. A method for automatically processing point cloud based on reinforcement learning, comprising:
   scanning to collect a point cloud (PCL) and an image through a Light Detection and Ranging (Lidar) and a camera;
   calibrating, by a controller, to match locations of the image and the point cloud through reinforcement learning that maximizes a reward including geometric and luminous intensity consistency of the image and the point cloud; and
   meshing, by the controller, the point cloud into a 3D image through reinforcement learning that minimizes a reward including a difference between a shape of the image and a shape of the point cloud,
   wherein the meshing is performed by an action including a motion vector of a catch particle, and
   wherein the meshing comprises determining the motion vector to capture a point cloud having highest correlation among adjacent point clouds.

2. The method of claim 1, wherein the calibrating is performed by an action comprising a translation velocity vector and a rotation velocity vector.

3. The method of claim 2, wherein in the calibrating, the reward comprises a luminous intensity loss which is a pixel-wise error between a mis-calibrated depth map and a target depth map, and a point cloud distance loss which is a distance between a transformed point cloud and a target point cloud.

4. The method of claim 3, wherein the point cloud distance loss is a sum of squares of distances of closest points between two point clouds.

5. The method of claim 2, wherein in the calibrating, the reinforcement learning is performed by a discrete value iteration (DVI) reinforcement learning algorithm.

6. The method of claim 2, wherein the calibrating comprises transforming the point cloud into a depth map by projecting the point cloud onto an image plane.

7. The method of claim 6, wherein the calibrating comprises a step of 3D spatial transformation which transforms the depth map by a transformation matrix.

8. The method of claim 1, wherein in the meshing, the reward comprises a difference between a location of an octree data extracted from the image and a location of a point cloud to be connected next which is captured by the catch particle through a motion according to the action.

9. The method of claim 1, wherein the meshing comprises dividing the point cloud into small unit screens and parsing while moving a window.

10. The method of claim 1, wherein in the meshing, the reinforcement learning is performed by a discrete value iteration (DVI) reinforcement learning algorithm.

11. A reinforcement learning based Light Detection and Ranging (Lidar)-camera calibration method that matches locations of a point cloud (PCL) and an image collected by a Lidar and a camera, based on reinforcement learning, in a system for automatically processing point cloud based on reinforcement learning,
wherein the reinforcement learning is performed by a reward for maximizing geometric and luminous intensity consistency of the image and the point cloud, and an action including a translation velocity vector and a rotation velocity vector, and
wherein the reward comprises a luminous intensity loss which is a pixel-wise error between a mis-calibrated depth map and a target depth map, and a point cloud distance loss which is a distance between a transformed point cloud and a target point cloud.

12. The method of claim 11, wherein the point cloud distance loss is a sum of squares of distances of closest points between two point clouds.

13. The method of claim 11, wherein the reinforcement learning is performed by a discrete value iteration (DVI) reinforcement learning algorithm.

14. The method of claim 11, further comprising: transforming the point cloud into a depth map by projecting the point cloud onto an image plane.

15. The method of claim 14, further comprising a step of 3D spatial transformation which transforms the depth map by a transformation matrix.

16. A reinforcement learning based point cloud mesh method that meshes a point cloud into a 3D image, using a point cloud and an image collected by a Light Detection and Ranging (Lidar) and a camera, based on reinforcement learning, in a system for automatically processing point cloud based on reinforcement learning,
wherein the reinforcement learning is performed by a reward for minimizing a difference between a shape of the image and a shape of the point cloud, and an action including a motion vector of a catch particle, and
wherein the reinforcement learning comprises determining the motion vector to capture a point cloud having highest correlation among adjacent point clouds.

17. The method of claim 16, wherein the reward comprises a difference between a location of an octree data extracted from the image and a location of a point cloud to be connected next which is captured by the catch particle through a motion according to the action.

18. The method of claim 16, further comprising:
dividing the point cloud into small unit screens and parsing while moving a window.

19. The method of claim 16, wherein the reinforcement learning is performed by a discrete value iteration (DVI) reinforcement learning algorithm.

20. A system for automatically processing point cloud based on reinforcement learning, comprising:
a Light Detection and Ranging (Lidar) for collecting a point cloud;
a camera for collecting an image; and
a controller communicatively connected to the Lidar and the camera and configured to:
calibrate to match locations of the image and the point cloud through reinforcement learning that maximizes a reward including geometric and luminous intensity consistency of the image and the point cloud, and
mesh the point cloud into a 3D image through reinforcement learning that minimizes a reward including a difference between a shape of the image and a shape of the point cloud,
wherein the controller is configured to mesh the point cloud into the 3D image by an action including a motion vector of a catch particle, and
wherein the controller is configured to determine the motion vector to capture a point cloud having highest correlation among adjacent point clouds.

21. A reinforcement learning based Light Detection and Ranging (Lidar)-camera calibration system, comprising:
a Lidar for collecting a point cloud;
a camera for collecting an image; and
a controller communicatively connected to the Lidar and the camera and configured to match locations of the point cloud and the image based on reinforcement learning,
wherein the reinforcement learning is performed by a reward for maximizing geometric and luminous intensity consistency of the image and the point cloud, and an action including a translation velocity vector and a rotation velocity vector, and
wherein the reward comprises a luminous intensity loss which is a pixel-wise error between a mis-calibrated depth map and a target depth map, and a point cloud distance loss which is a distance between a transformed point cloud and a target point cloud.

22. A reinforcement learning based point cloud mesh processing system, comprising:
a Light Detection and Ranging (Lidar) for collecting a point cloud;
a camera for collecting an image; and
a controller communicatively connected to the Lidar and the camera and configured to mesh the point cloud into a 3D image, using the point cloud and the image, based on reinforcement learning,
wherein the reinforcement learning is performed by a reward for minimizing a difference between a shape of the image and a shape of the point cloud, and an action including a motion vector of a catch particle, and
wherein the reinforcement learning comprises determining the motion vector to capture a point cloud having highest correlation among adjacent point clouds.

* * * * *